United States Patent [19]
Lee et al.

[11] Patent Number: 5,813,487
[45] Date of Patent: Sep. 29, 1998

[54] OMNIBUS

[75] Inventors: Robert Lee, Leinfelden-Oberaichen; Karl-Heinz David, Stuttgart, both of Germany

[73] Assignee: Gottlob Auwärter GmbH & Co., Germany

[21] Appl. No.: 807,252

[22] Filed: Feb. 28, 1997

[30] Foreign Application Priority Data

Sep. 2, 1994 [DE] Germany .......................... 44 31 305.5

[51] Int. Cl.[6] .......................................... B60K 1/00
[52] U.S. Cl. ..................... 180/65.1; 180/65.3; 180/65.5; 180/412
[58] Field of Search .................... 180/413, 412, 180/65.3, 65.4, 65.5, 414, 415, 65.1

[56] References Cited

U.S. PATENT DOCUMENTS

| | | | |
|---|---|---|---|
| 2,425,948 | 8/1947 | Lucien . | |
| 4,446,941 | 5/1984 | Laurich-Trost | 180/236 |
| 4,558,758 | 12/1985 | Littman et al. | 180/8.1 |
| 4,579,186 | 4/1986 | Uno et al. | 180/140 |
| 4,953,649 | 9/1990 | Kawai et al. | 180/79.1 |
| 5,004,061 | 4/1991 | Andruet | 180/65.5 |
| 5,207,287 | 5/1993 | Sano et al. | 180/140 |
| 5,224,563 | 7/1993 | Iizuka et al. | 180/65.3 |
| 5,244,054 | 9/1993 | Parry | 180/165 |
| 5,641,031 | 6/1997 | Riemer et al. | 180/65.3 |

FOREIGN PATENT DOCUMENTS

| | | |
|---|---|---|
| 0 221 729 | 5/1987 | European Pat. Off. . |
| 0 244 549 | 11/1987 | European Pat. Off. . |
| 0 417 820 | 3/1991 | European Pat. Off. . |
| 0 509 221 | 10/1992 | European Pat. Off. . |
| 30 45 114 | 6/1982 | Germany . |
| 35 06 048 | 8/1985 | Germany . |
| 39 29 994 | 3/1990 | Germany . |
| 39 09 861 | 9/1990 | Germany . |
| 40 12 704 | 10/1991 | Germany . |
| 42 01 513 | 7/1993 | Germany . |
| 42 06 360 | 9/1993 | Germany . |

OTHER PUBLICATIONS

Conference Report of F. Werner, "4. Internationales Elektro–Fahrzeug–Symposium," *ATZ Automobiltechnische Zeitschrift*, vol. 79 (1977), No. 2, pp. 42–44.

H. Ahlbrecht, "Wege zum Niederfluromnibus," *Nahverkehrspraxis*, vol. 10, 1987, pp. 385–391.

"Weitere Schritte zum Fortschritt," *Omnibus–Revue*, Sep. 1994, pp. 16 and 17.

*Primary Examiner*—Brian L. Johnson
*Assistant Examiner*—Bridget Avery
*Attorney, Agent, or Firm*—Barry R. Lipsitz; Ralph F. Hoppin

[57] ABSTRACT

An omnibus with steered front wheels as well as steered and driven rear wheels, the rear wheels being arranged in the region of a rear end of the omnibus such that wheel housings associated with the rear wheels are arranged essentially at the rear end and/or outside the passenger compartment. A particularly compact and economical drive is obtained due to fact that the drive for the rear wheels comprises an electric drive, wherein the rear wheels are driven by wheel hub motors free of slip and the wheel hub motors are designed as electric motors.

33 Claims, 5 Drawing Sheets

OMNIBUS

BACKGROUND OF THE INVENTION

The present invention relates to an omnibus, in particular of a drop-frame construction.

Omnibuses serve primarily to transport a large number of people. In order to make it possible to board and alight easily and quickly it is desirable to arrange a floor of a passenger compartment of the omnibus as low as possible. This is termed as drop-frame construction. Drop-frame buses of this type are used, in particular, for public transport.

In the case of omnibuses, the rear wheels are mostly arranged approximately in an area between two thirds to three quarters of the length of the vehicle. Especially in the case of drop-frame buses, the rear wheels are arranged rather further forwards in order to achieve the maneuverability required for urban driving which is determined by the wheelbase of the omnibus.

A number of disadvantages therefore result. Wheel housings associated with the rear wheels protrude into the passenger compartment of the omnibus and necessitate an arrangement of passenger seats which takes this into account. It is, for example, customary to arrange passenger seats facing contrary to the direction of travel in order to utilize the space offered in the passenger compartment as well as possible. However, the comfort of passengers traveling contrary to the direction of travel is less. In addition, a drive for the rear wheels has considerable space requirements, drive elements needing to be arranged, in particular, between the rear wheels. This results in the floor of the passenger compartment needing to have a quite considerable minimum height, at least in the region of the rear wheels. In contrast to this minimum height, the floor in the front region of the omnibus can be arranged to lie much lower and so an upward slope in the floor towards the end of the bus is necessary. This is awkward especially for handicapped and older people and increases the risk of accidents.

When arranging rear side doors of the omnibus for passengers to board and alight, the position of the rear wheels is to be taken into account since a door cannot be arranged in the area of a rear wheel. As a result, the doors cannot be arranged in an optimum way for as rapid a boarding and alighting as possible.

Passengers who are seated or stand at the end of the passenger compartment have only limited traveling comfort since, as a result of the rear overhang of the omnibus beyond the rear wheels, bumps in the road surface are passed on to the passengers in an amplified manner.

DE 42 01 513 A1 discloses an omnibus of the type described at the outset with a drop-frame construction, comprising steerable front wheels and driven, likewise steerable rear wheels. The rear wheels are arranged in the rearmost section of the bus and driven by an engine which forms a Z-shaped drive train with the rear axle in that the engine is arranged with a transmission flanged thereto approximately parallel to the rear axle and above this and the output shaft of the transmission is connected to a central differential of the rear axle via bevel gears and a cardan shaft extending at an angle downwards. The steering of the rear wheels is coupled to the steering of the front wheels, wherein the rear wheels can be steered not only in the same direction, for example, for an exact driving in and out of stop bays, but also in opposite directions for driving around narrow bends.

This known omnibus allows an optimized design of the floor, although the space required by the drive is considerable. It is, in addition, disadvantageous that the Z-shaped drive train with the necessary deflections conflicts with a design of the drive for the omnibus which is optimized with respect to consumption.

The article "Wege zum Niederfluromnibus" (=Ways to a Drop-Frame Omnibus) from the magazine "nahverkehrspraxis" No. 10/1987, pages 387 and 388, describes a drop-frame omnibus which has at the rear end a steered rear axle which is driven hydrostatically.

It is also disadvantageous in the case of this omnibus that no optimum efficiency can be attained since a hydraulic drive is always subject to a certain slip.

Furthermore, EP 0 244 549 A1 discloses a hydrostatic drive for an omnibus comprising a rear axle arranged at the end of the vehicle. A steerability of the rear axle is not, however, disclosed. The hydrostatic drive and the rear wheels form a drive unit which can be detached from the body of the omnibus. The drive itself comprises a diesel engine which is coupled directly to a hydraulic pump. This acts on two hydraulic motors, which are designed as wheel hub motors and each connected directly to the rear wheels via planetary gears. Moreover, energy storage means are provided for storing hydraulic oil subject to high and low pressure, and energy can be supplied to them during braking not only through the hydraulic pump but also through the wheel hub motors.

In this case, again, an overall efficiency of the drive results which is not optimal. In addition, the space requirements for this drive are relatively high on account of the pressure tank provided.

The object underlying the invention is to provide an omnibus with the features specified at the outset, which allows a particularly compact design of the drive, wherein the drive has an optimized efficiency and so an operation of the omnibus which is favorable with respect to consumption is made possible.

SUMMARY OF THE INVENTION

The inventive solution results in a drive with an optimum efficiency. For example, a transmission with a large number of gear steps is not required in the case of the electric drive, whereby losses of power in the drive train can be avoided. A high efficiency is aided, in addition, by the slip-free coupling of the electric motors to the rear wheels. Furthermore, the use of wheel hub motors is conducive to a considerable economy and compact construction since linkage rods, cardan shafts, differential transmissions and other power transmission means are not required.

The slip-free coupling of the wheel hub motors to the rear wheels facilitates, in addition, an effective braking by the wheel hub motors with a corresponding switching of the electric motors. Moreover, the electric drive allows an exhaust-free and thus environmentally beneficial operation of the omnibus, for example due to use of on-board accumulators, fuel cells, flywheel storage means or a supply via overhead line.

The electric motors are each preferably connected to a rear wheel via a gear unit. This means that a space-saving construction of the omnibus drive is made possible with low, constructional resources.

For the supply of current to the electric drive, it is provided in accordance with a preferred design variation that the drive for the rear wheels comprises a generator driven by an internal combustion engine. The internal combustion engine is, in particular, a diesel or gasoline engine. On account of a high efficiency of the electric drive with extremely low power transfer losses, a very favorable overall efficiency results in conjunction with the generator and the internal combustion engine, with a low total weight of all the components necessary for the drive. In addition, the internal combustion engine can always be operated in a particularly favorable range of speed so that a very low fuel consumption is made possible. A preferred supplementation results from the fact that the drive for the rear wheels comprises an energy storage means, in particular an accumulator. A flywheel storage means may also be considered as energy storage means. Particularly with an accumulator as energy storage means in conjunction with an electric drive for the rear wheels it is possible, apart from the compensation of peak load consumptions during starting up, to also travel longer distances exhaust-free, for example when passing through an urban area.

The efficiency of the drive is increased as a whole by the fact that a drive control unit is provided for controlling or regulating the electric drive and its supply of current and, in particular, a feedback of energy. The electric drive can thus work during the braking of the omnibus as a generator which generates energy which is temporarily stored in the energy storage means. Furthermore, the internal combustion engine can work with the generator under optimum operating conditions with best efficiency, whereby an excess of energy is stored temporarily in the energy storage means so that the internal combustion engine can be switched off from time to time and the electric drive is then supplied with energy exclusively from the energy storage means. Thus, a particularly optimum energy utilization is made possible.

In a very advantageous embodiment it is provided for all the components required for driving, steering and braking the rear wheels, including a steerable rear axle, to form one drive unit. This drive unit is pre-assembled and so a particularly speedy final assembly of the omnibus results. In this respect, the components which generate the steering, braking and driving forces are arranged in the drive unit. However, control elements, such as a steering wheel, brake pedal or accelerator pedal, are arranged in a driver's compartment in a front part of the body of the omnibus.

In this respect, it is provided, in particular, for the drive unit to have a common housing which is soundproof to a large extent, at least in relation to the body of the omnibus.. A particularly quiet driving aggregate is thus realized and a high traveling comfort for passengers obtained.

A particularly good sound decoupling of the passenger compartment from the drive unit is achieved when the body of the omnibus is produced essentially from fiber composite material, i.e. not from metal, in order to minimize the transfer of sound conducted through solids. Furthermore, the body of the omnibus can be of a very lightweight design when fiber composite material is used for it and so the front axle load allowed by law is not exceeded despite the rear axle being located far to the back and, moreover, an optimization of consumption is made possible.

It is provided for the drive unit to be connected to the body of the omnibus via structural elements which are, in particular, sound-absorbing and/or shock-absorbing. This results in an optimum traveling comfort for passengers since the generation of noise by the drive and rolling sounds of the rear wheels are arranged as far removed as possible from the passenger compartment and are insulated to the greatest extent. Furthermore, the few structural elements necessary for connecting the drive unit to the body result in an excellent detachment of the body from vibrations of the drive unit and so a considerably improved traveling comfort results.

This is aided, in addition, by the fact that the drive unit has for the purpose of control only linkage-less control connections to the body of the omnibus, such as electric, pneumatic or hydraulic control lines.

A particularly advantageous embodiment is characterized by the fact that the drive unit can be coupled to and uncoupled from the body of the omnibus. This makes it possible, for example, to produce drive unit and body of the omnibus separately and also service or repair the two parts separately.

A simple and fast coupling and uncoupling of the drive unit on the body of the omnibus results from the fact that the structural elements connecting the drive unit to the body are designed as coupling elements and the control connections have rapid action couplings, such as plug connections, in the region of a transition between the body and the drive unit. When the drive unit is uncoupled from the body, for example, only the control connections have to be disconnected and, subsequently, the mechanical connection to the body can be released very simply and quickly. A coupling takes place in reverse order.

It is advantageously provided for the drive unit to be attachable to different bodies. This results in a system, with which, for example, different lengths of body can be combined with a drive unit for different uses. It is then also possible to repair a body again following an accident while the drive unit, which forms a particularly expensive part of the bus, is in continued use with another body. Furthermore, the universal couplability of the drive unit to bodies allows a division of work during the production insofar as the drive unit can be produced and delivered to different body builders for the purpose of forming a complete omnibus.

The drive unit preferably forms a rear part of the body of the omnibus. This avoids difficulties which could otherwise occur when inserting or mounting the drive unit in a shell section of the body. In addition, a more simple production results altogether since the housing of the drive unit forms at the same time the rear part of the body shell of the omnibus.

As the rear wheels are steered, this results in a great maneuverability of the omnibus, should this be required in critical situations, in particular in urban traffic. A bus driver can maneuver the omnibus around obstacles without any problem despite the long wheelbase.

In a preferred development it is provided for a steering movement of the rear wheels to be coupled to a steering movement of the front wheels. In this respect, it is provided, in particular, for the rear wheels to be steered contrary to the direction of the front wheels so that a great maneuverability of the omnibus is achieved. For example, it may be provided in the case of the coupling that the ratio of the countersteering of the rear wheels in relation to the front wheels is altered as a function of the curve radius, i.e. as a function of the steering angle of the front wheels, such that in the case of a smaller curve radius the countersteering of the rear wheels is relatively greater than in the case of a larger curve radius. In this way, a particularly great maneuverability of the omnibus in sharp bends is achieved.

In a further, particularly preferred development it is provided for the steering movement of the rear wheels to be coupled to the steering movement of the front wheels such that a predeterminable, virtual wheelbase is generated which is, in particular, shorter than the actual wheelbase. As a result of a corresponding correlation of the steering movements it is possible for the omnibus to handle, during turning, as if the wheelbase is, for example, shorter than the actual wheelbase. In this case, the rear wheels steer in the opposite direction to the steering angle of the front wheels such that a turning characteristic is obtained which corresponds to a shorter wheelbase than the actual wheelbase. The wheelbase simulated by the bend handling of the omnibus is designated as virtual wheelbase. It corresponds to the wheelbase of an unsteered rear axle. This results in a maneuverability of the inventive omnibus which corresponds to that of a previously known omnibus, the inventive omnibus having, in addition, improved driving properties with respect to the smooth running on account of the longer, actual wheelbase.

An advantageous embodiment is characterized by the fact that the virtual wheelbase can be adjusted. It is thus possible to provide a wheelbase which is the best possible for the respective use of the omnibus, such as a particularly short wheelbase for frequent town driving and a longer wheelbase for rural driving. Apart from the specified, general setting of the virtual wheelbase, a short-term and/or manual adjustment of the virtual wheelbase to an actual driving situation, in particular, is possible, for which purpose an input element is provided in a driver's compartment of the omnibus for adjusting the virtual wheelbase. This input element can also be designed such that the steering of the rear wheels takes place independently of the front wheel steering.

In a further design alternative, it is provided for the virtual wheelbase to be controlled or regulated as a function of a traveling speed of the omnibus. In this respect, the virtual wheelbase is altered, in particular, towards a longer wheelbase with increasing traveling speed, proceeding from a shorter wheelbase. Thus, an excellent directional stability of the omnibus is ensured at high traveling speeds and a good maneuverability at low traveling speeds.

In a special development it is provided for the shorter wheelbase to be adjustable and the longer wheelbase to be specifically predeterminable. In this way, the desired maneuverability can be set at low traveling speeds, whereby the same driving stability is, however, always ensured at high traveling speeds for safety reasons by the specifically predetermined longer wheelbase.

For easier maneuvering of the omnibus, in particular below a certain traveling speed, it is preferably provided for the coupling of the steering movements of the front and rear wheels to be overridden and the steering of the rear wheels to be freely controllable. It is thus possible to operate the steering of the front wheels and the steering of the rear wheels independently of one another in particularly difficult driving situations. Consequently, a bus driver can also execute unusual driving movements with the bus, such as parallel driving by way of the same angle of front and rear wheels.

It is to be noted that the specified parallel driving of the omnibus is, however, also achieved with a setting of the virtual wheelbase to an infinitely large value.

A coupling of the steering movements of the front and the rear wheels preferably takes place without a mechanical connection, in particular without any linkage rods. This is advantageous from a constructional point of view since, otherwise, a mechanical connecting member extending almost over the entire bus length would have to be present between the steering systems.

It is provided for the steering of the rear wheels to be activated electrically and/or hydraulically. Such an activation may be realized relatively inexpensively with commercial components.

A simple, constructional realization of a coupling between the steering movement of the front wheels and the steering movement of the rear wheels results from the fact that the steering of the rear wheels is controlled or regulated as a function of a position of a steering wheel for the steering of the front wheels. This results in a simple and reliable construction. Alternatively, a steering angle gauge can be provided on the front axle for the steering of the rear wheels.

A steering control unit which controls or regulates the steering of the rear wheels as a function of the steering of the front wheels is provided. In this respect, the control unit can monitor an efficient functioning of the rear wheel steering and undertake the exact control or regulation of the rear wheel steering to achieve a specified, virtual wheelbase.

In one variation it is provided for the omnibus to have as rear axle a twin axle, formed from a driven, steered axle and a steered trailing or leading axle. The additional trailing or leading axle can be automatically steered. It is, again, arranged at the end of the omnibus as far to the back as possible. This results in essentially the same advantages as in the case of an omnibus having, altogether, only two axles with a rear axle arranged at the extreme end side. Such an additional axle can be necessary in order not to exceed admissible axle loads depending on the total weight of the omnibus.

The invention will be explained in greater detail in the following on the basis of the drawings of one embodiment.

DETAILED DESCRIPTION OF THE INVENTION

Figure 1:
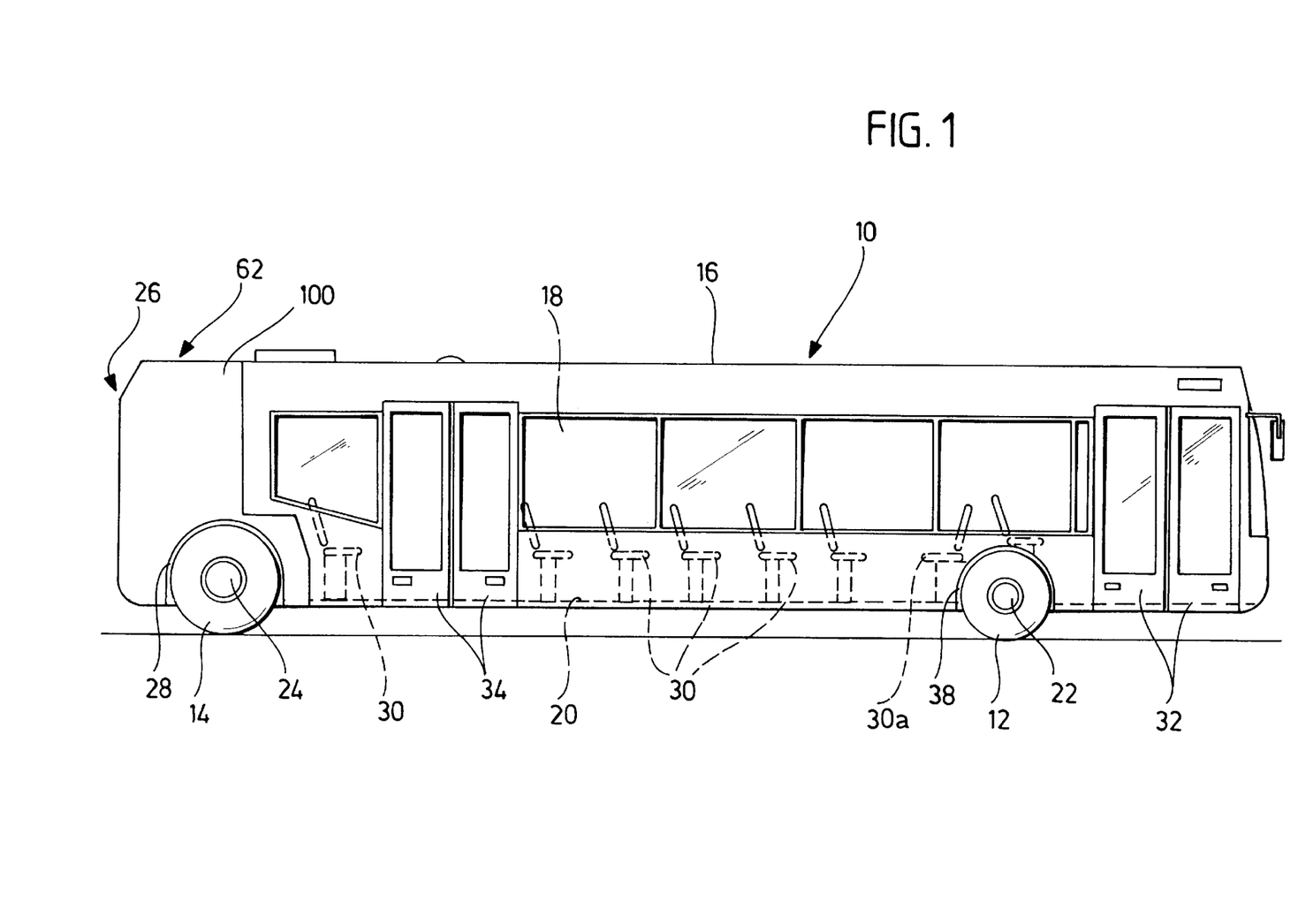
FIG. 1: shows a side view of an inventive omnibus.
Figure 2:
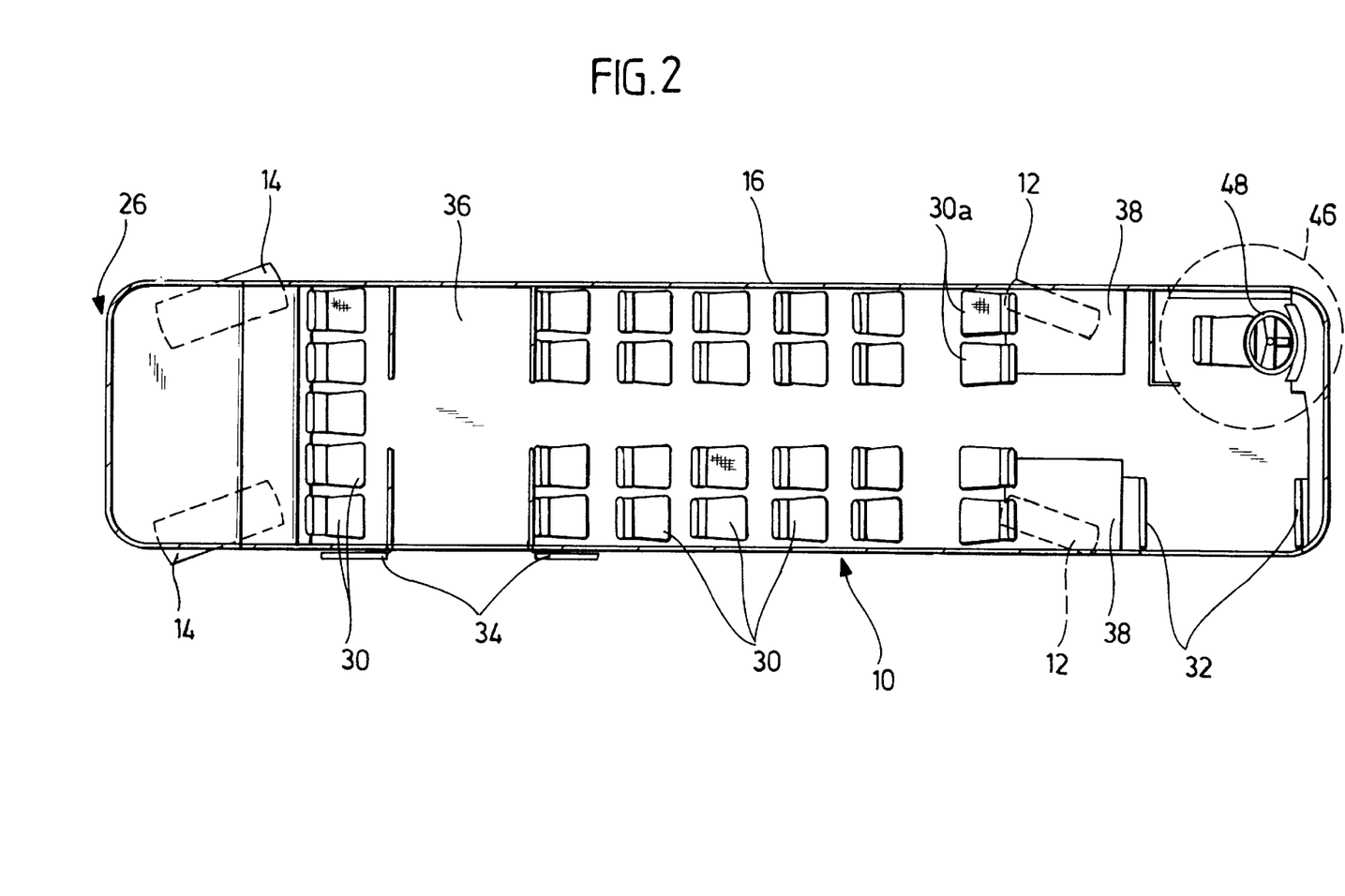
FIG. 2: shows a plan view of the omnibus without a roof and with turned front and rear wheels.
Figure 3:
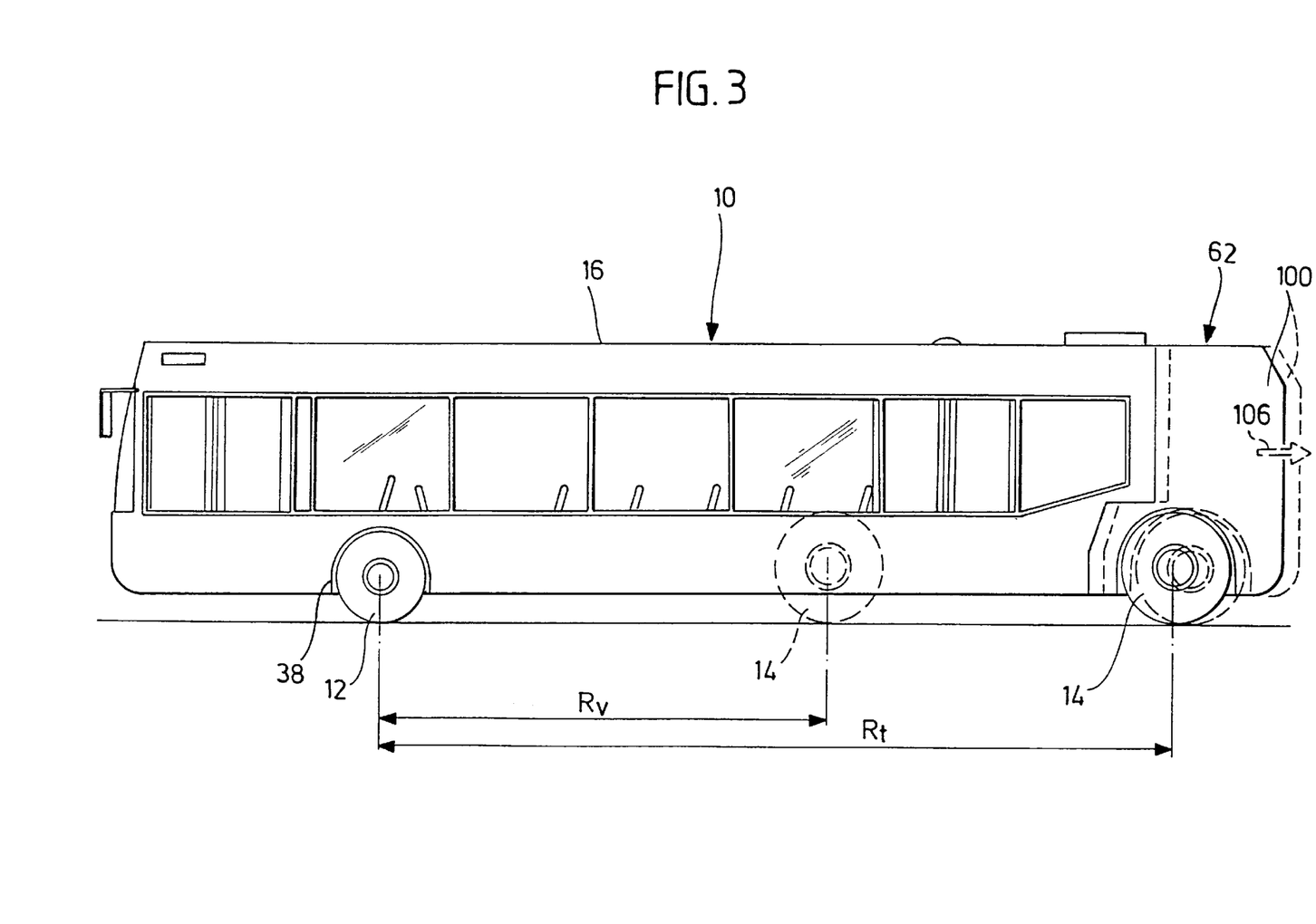
FIG. 3: shows another side view of the omnibus, in which an uncoupled drive unit is illustrated by broken lines.

FIGS. 1, 2 and 3 show an omnibus 10 in a drop-frame construction with front wheels 12 and rear wheels 14. Both the front wheels 12 and the rear wheels 14 are steered.

It is apparent from FIG. 1 that the omnibus 10 has a body 16 with a passenger compartment 18. A floor 20 of the passenger compartment 18 is arranged lower than wheel hubs 22 and 24 of the front wheels 12 and the rear wheels 14.

It is also apparent from FIG. 1 that the rear wheels 14 are arranged very close to a rear end 26 of the omnibus 10. On account of this arrangement of the rear wheels 14 located far to the back, associated wheel housings 28 are arranged outside the passenger compartment 18. This results in a completely flat and low floor 20 right up to the rear end of the passenger compartment 18. In the present case, the omnibus 10 is provided for suburban services. Consequently, it has particularly large side front doors 32 and side rear doors 34. In conjunction with the low floor 20, this results in easy boarding and alighting for passengers. Furthermore, a plurality of seats 30 for passengers are arranged in the vehicle interior 18.

FIG. 2 shows the doors 32 and 34 in an opened state. It can be seen that a free area 36 without seats 30 is formed in the passenger compartment 18 in the region of the rear side doors 34 as far as the oppositely located longitudinal side of the passenger compartment 18. This area 36 represents standing room for passengers.

Five seats 30 are arranged in a transverse row at the rear end of the passenger compartment 18. Otherwise, the seats 30 are respectively distributed in double rows on both sides of the passenger compartment 18 in the omnibus 10, a few seats 30a also being arranged to face contrary to a direction of travel of the omnibus 10 on account of wheel housings 38 of the front wheels 12 being located in the front part of the passenger compartment 18. Since the wheel housings 28 of the rear wheels 4 are arranged outside the passenger compartment 18, it is not necessary in the rear passenger compartment 18 to arrange seats 30 facing contrary to the direction of travel.

FIG. 2 shows the omnibus 10 with turned front wheels 12 and turned rear wheels 14, the rear wheels 14 steering in the opposite direction to the front wheels 12, i.e. showing a steering movement in the opposite direction. This countersteering of the rear wheels 14 takes places as a function of a steering movement of the front wheels 12. How a coupling of the steering movements is realized, will be described later on the basis of FIG. 5.

On account of the coupling of the steering movements of the front wheels 12 and the rear wheels 14 in opposite directions, it is possible to reduce the actual wheelbase $R_r$, which is illustrated in FIG. 3 and is determined by the distance between the wheels hubs 22 and 24 of the front and rear wheels 12, 14, to a virtual wheelbase $R_v$ when traveling round bends. This virtual wheelbase $R_v$, illustrated by way of example in FIG. 3, corresponds to the handling of the omnibus 10 with unsteered rear wheels arranged in the position illustrated by broken lines when traveling round bends and is determined by the coupled countersteering of the rear wheels 14 placed at the end. This results in an excellent maneuverability of the omnibus 10 while traveling round bends, whereby the advantages of the longer, actual wheelbase $R_r$, such as a particularly good compensation of uneven road surfaces, are, however, retained.

Figure 5:
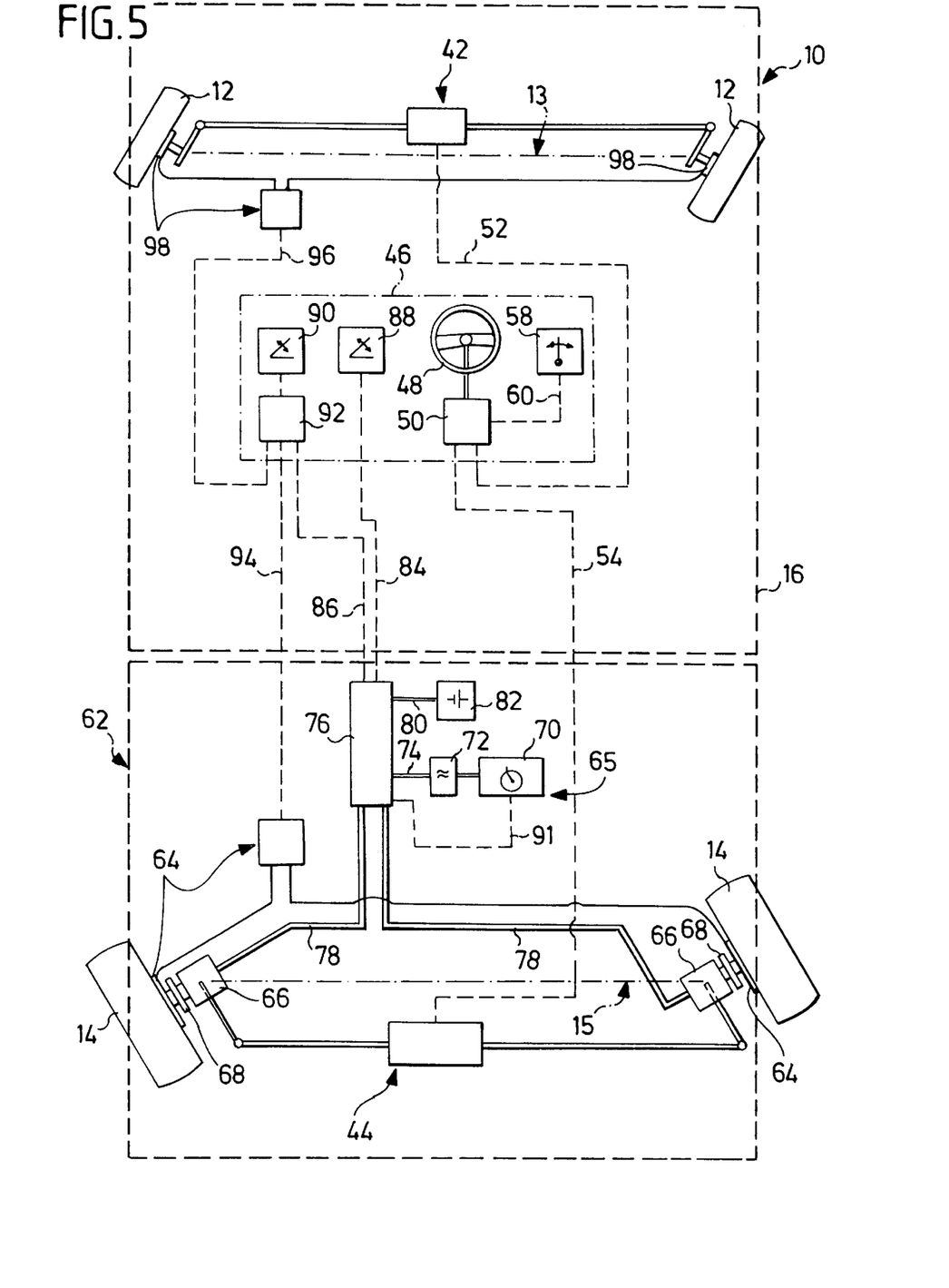
FIG. 5: shows a sketch of important components and their connections.

The coupling of the steering movements of the front wheels 12 and the rear wheels 14 will be explained in the following on the basis of FIG. 5. FIG. 5 shows the most important components for driving, braking and steering in a schematic illustration and their connections to one another.

The front wheels 12 are arranged on the omnibus 10 so as to be steerable via wheel suspensions which are not illustrated and which form a front axle 13 of the omnibus 10. Accordingly, the rear wheels 14 are arranged on the omnibus 10 so as to be steerable via wheel suspensions which are not illustrated and which form a rear axle 15 of the omnibus. Both axles 13, 15 are merely indicated in FIG. 5.

A steering system 42 is associated with the front wheels 12 and a steering system 44 with the rear wheels 14. The steering system 42 can cause the front wheels 12 to turn and the steering system 44 cause the rear wheels 14 to turn. Each steering system 42, 44 comprises steering elements necessary for this purpose, such as linkage rods or the like, which are only indicated in FIG. 5.

A steering wheel 48 is provided in the region of a driver's compartment 46 of the omnibus 10, as also indicated in FIG. 2, for the control of the steering of the omnibus 10 by a bus driver who is not illustrated. This steering wheel 48 acts on a steering control unit 50 which controls the steering system 42 and the steering system 44 via control lines 52 and 54 as a function of the position of the steering wheel 48. The control can take place electrically or pneumatically, whereby the control lines 52 and 54 can also each consist of several lines and/or conductors.

The steering control unit 50 correlates a steering movement of the front wheels 12 with a steering movement of the rear wheels 14 by means of a corresponding activation of the steering system 42 and the steering system 44. The coupling of the steering movements takes place, in particular, such that a specific, predetermined virtual wheelbase $R_v$ is obtained when the omnibus 10 is traveling round bends. This virtual wheelbase may be altered as required by a bus driver by means of an input element 58 which has a control connection 60 to the steering control unit 50. The steering device 50 controls the coupling of the steering movements depending on a preselected virtual wheelbase.

In the case of the omnibus 10, the rear wheels 14 are driven. For this purpose, the omnibus 10 has a drive 65 which comprises a plurality of components. The term "drive 65" is to be understood, in particular, as all the components which act mechanically on the rear wheels 14 but also all the components which serve, for example, to make drive energy available, i.e. are indirectly required for driving the rear wheels 14.

The rear wheels 14 are arranged on a drive unit 62 which comprises the rear axle 15, the steering system 44, the drive 65 and a braking system 64 associated with the rear wheels 14. The drive 65 has wheel hub motors 66 which are each connected to a rear wheel 14 via a gear unit 68. The wheel hub motors 66 are electric motors which drive the rear wheels 14 without slip. A respective wheel hub motor 66 and a respective gear unit 68, together with the associated rear wheel 14, are pivotally arranged for steering by means of the steering system 44.

In addition, the drive 65 comprises an internal combustion engine 70 in the form of a diesel engine which drives a generator 72. Current generated by the generator 72 is supplied to the wheel hub motors 66 by means of lines 74 via a control unit 76 and lines 78. The control unit 76 is, furthermore, connected to an accumulator 82 via lines 80. All these components are parts of the drive 65. The control unit 76 receives signals from an accelerator pedal 88 and a brake pedal 90 in the driver's compartment 46 of the omnibus 10 by means of control lines 84 and 86. The control unit 76 controls the wheel hub motors 66, an energy storage means and energy withdrawal from the accumulator 82 as a function of these signals. Furthermore, the control unit 76 controls the diesel engine via a control line 91.

The control unit 76 controls the energy supplied to the wheel hub motors 66 and thus the speed of the omnibus 10 in accordance with a position of the accelerator pedal 88. The control unit 76 can control the diesel engine and thus the performance of the generator 72 as required and store any excess energy in the accumulator 82. When the omnibus 10 is braked, the brake pedal 90 is actuated and the control unit 76 recognizes the braking procedure via the signal line 86. The wheel hub motors 66 are then operated as generators and the recovered electrical energy is stored in the accumulator 82. In this respect, the wheel hub motors 66 act on the rear wheels 14 as a brake via the gear units 68.

The control unit 76 can switch off the diesel engine depending on the drive situation and as a function of the charge state of the accumulator 82 and supply the wheel hub motors 66 with energy from the accumulators 82. Such a switching off of the diesel engine offers itself, in particular, for traveling through urban areas in order to avoid or to minimize exhaust and noise disturbance.

In addition, the omnibus 10 has a braking control unit 92 which is associated with the brake pedal 90 and activates the braking system 64 for the rear wheels 14 via control lines 94 and a braking system 98 for the front wheels 12 via control lines 96. The braking control unit 92 can hereby act on the braking systems 64 and 98 electrically, pneumatically or hydraulically. The braking systems 64 and 98 are indicated only schematically in FIG. 5. They comprise all the components necessary for controlling braking force and can include, for example, drum brakes or disk brakes.

Figure 4:
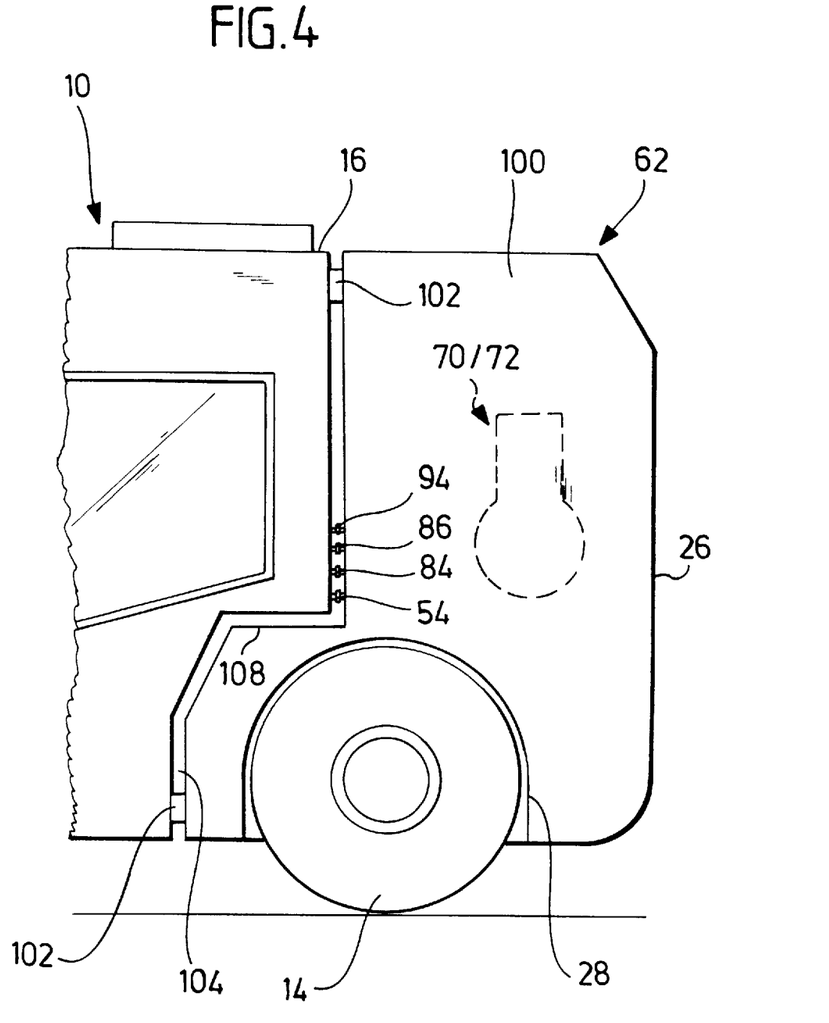
FIG. 4: shows a diagrammatic sketch of the connections between the drive unit and a body of the omnibus.

The drive unit 62 thus comprises all the components required for driving, steering and braking the rear wheels 14, including necessary control elements. The drive unit 62 forms a compact unit and has, as shown in FIGS. 1, 3 and 4, a housing 100. In addition, it forms a rear part of the body 16 of the omnibus.

FIG. 4 shows schematically how the drive unit 62 is connected to the body 16 of the omnibus 10 via structural elements 102. For reasons of illustration, an open gap 104 increased in size is hereby illustrated between the body of the omnibus and the housing 100 of the drive unit 62. In fact, the gap 104 is covered smoothly on the outer side. For this purpose, the body 16 and/or the housing 100 have flanges which are not illustrated and which form a smooth outer skin of the omnibus 10 beyond the gap 104. The gap 104 between the body 16 and the drive unit 62 leads to an excellent soundproofing between the two parts.

Only two structural elements 102 are illustrated in FIG. 4 but at least 4 or 6 such structural elements 102 are provided for the secure connection of the drive unit 62 to the body 16. The structural elements 102 are preferably designed to be shock-absorbing in order to prevent, to a large extent, sounds conducted through solids and other vibrations from passing into the body 16 from the drive unit 62. This results in considerably improved traveling comfort for passengers.

The structural elements 102 are designed, in particular, as coupling elements, and the control lines 54, 84, 86 and 94 have, as indicated in FIG. 4, plug connections which can be disconnected. These plug connections are indicated in the region of transition between the body 16 of the omnibus and the drive unit 62. The control lines 54, 84, 86, 96 as well as additional control connections between the drive unit 62 and the body 100, which are not illustrated and which are provided for monitoring functions, heating, supply of current, etc., can thus be easily disconnected and reconnected.

Consequently, the drive unit 62 can, as illustrated by broken lines in FIG. 3, be uncoupled from the body 16 of the omnibus and withdrawn in accordance with arrow 106. For this purpose, all the control connections between the body 16 and the drive unit 62 merely have to be separated which can be carried out very easily and quickly by means of the plug connections provided.

Subsequently or at the same time, the structural elements 102 designed as coupling elements are opened, and the drive unit 62 is released from the body 16 of the omnibus. During the withdrawal of the drive unit 62 illustrated by broken lines in FIG. 3, the body 16 and the drive unit 62 have, of course, to be suitably supported, which is not illustrated. The drive unit 62 is particularly compact due to the fact that the diesel engine with the generator 72 is arranged transversely to the direction of travel, as indicated in FIG. 4, at the rear end 26 of the omnibus 10 above the rear wheels 14. In combination with the space-saving wheel hub motors 66 and the fact that a mechanical transfer of power to the rear wheels 14 from the diesel engine located above them is not required, a quasi vertical chassis part results, the length of which is essentially determined by the size of the rear wheels 14 and their required freedom of movement for steering.

The drive unit 62 even has a smaller constructional length above the wheel housings 28 than in the region of the wheel housings 28. Consequently, the drive unit 62 forms a step 108 extending over the entire width of the omnibus 10, as is apparent from FIG. 4. The body 16 of the omnibus is of a complementary design to this. The passenger compartment 18, in particular, extends beyond the step 108 when the drive unit 62 is coupled in order to realize as large a passenger compartment 18 as possible.

We claim:

1. An omnibus comprising:

steered front wheels as well as steered and driven rear wheels, said rear wheels being arranged in a rear end region of the omnibus such that wheel housings associated with the rear wheels are arranged essentially at the rear end of the omnibus; and an electric drive comprising at least one electric wheel hub motor free of slip for driving the rear wheels;

wherein a steering movement of the rear wheels is coupled to a steering movement of the front wheels such that a predeterminable, virtual wheelbase $R_v$ is generated which is shorter than an actual wheelbase $R_t$.

2. An omnibus as defined in claim 1, wherein a separate electric wheel hub motor is connected to each rear wheel via a respective gear unit.

3. An omnibus as defined in claim 1, wherein the drive for the rear wheels comprises a generator driven by an internal combustion engine for supplying current to said at least one wheel hub motor.

4. An omnibus as defined in claim 3, wherein the internal combustion engine is one of a diesel engine and gasoline engine.

5. An omnibus as defined in claim 1, wherein the drive for the rear wheels comprises an accumulator used as an energy storage means.

6. An omnibus as defined in claim 1, wherein:

a control unit is provided for controlling or regulating the electric drive, a supply of energy therefor, and optionally a feedback of energy.

7. An omnibus as defined in claim 1, further comprising:

one drive unit, including a rear axle, for driving, steering and braking the rear wheels.

8. An omnibus as defined in claim 7, wherein the drive unit has a common housing.

9. An omnibus as defined in claim 8, wherein the housing is substantially soundproof in relation to a body of the omnibus.

10. An omnibus as defined in claim 7, wherein a body of the omnibus is essentially produced from a fiber composite material.

11. An omnibus as defined in claim 7, wherein the drive unit is connected to a body of the omnibus via sound absorbing and/or shock-absorbing structural elements.

12. An omnibus as defined in claim 7, wherein the drive unit provides control via linkage-less control connections to a body of the omnibus, said connections comprising at least one of electric, pneumatic and hydraulic control lines.

13. An omnibus as defined in claim 7 wherein the drive unit is adapted to be coupled to and uncoupled from a body of the omnibus.

14. An omnibus as defined in claim 12, wherein:

the control connections have rapid action couplings, such as plug connections, in the region of a transition between the body and the drive unit.

15. An omnibus as defined in claim 7, wherein the drive unit is adapted to be attached to different bodies.

16. An omnibus as defined in claim 11, wherein the drive unit is adapted to be attached to different bodies.

17. An omnibus as defined in claim 14, wherein the drive unit is adapted to be attached to different bodies.

18. An omnibus as defined in claim 7, wherein the drive unit forms a rear part of the body of the omnibus.

19. An omnibus as defined in claim 1, wherein the virtual wheelbase $R_v$ is adjustable.

20. An omnibus as defined in claim 19, wherein an input element is provided in a driver's compartment of the omnibus for adjusting the virtual wheelbase $R_v$.

21. An omnibus as defined in claim 20, wherein:

the virtual wheelbase $R_v$ is controlled or regulated as a function of a traveling speed of the omnibus, and the virtual wheelbase $R_v$ is altered, in particular, towards a longer wheelbase with increasing traveling speed, proceeding from a shorter wheelbase.

22. An omnibus as defined in claim 21, wherein the shorter wheelbase is adjustable and the longer wheelbase is specifically predeterminable.

23. An omnibus as defined in claim 1, wherein for maneuvering the omnibus below a certain traveling speed, the coupling of the steering movements of the front wheels and rear wheels is adapted to be overridden and the steering of the rear wheels is adapted to be freely controlled.

24. An omnibus as defined in claim 1, wherein a coupling of the steering movements of the front wheels and the rear wheels takes place without mechanical linkage rods.

25. An omnibus as defined in claim 20, wherein a coupling of the steering movements of the front wheels and the rear wheels takes place without mechanical linkage rods.

26. An omnibus as defined in claim 1, wherein the steering of the rear wheels is activated electrically and/or hydraulically.

27. An omnibus as defined in claim 1, wherein the steering of the rear wheels is controlled or regulated as a function of a position of a steering wheel for the steering of the front wheels.

28. An omnibus as defined in claim 1, wherein a steering control unit is provided, said unit controlling or regulating the steering of the rear wheels as a function of the steering of the front wheels.

29. An omnibus as defined in claim 1, wherein the omnibus has a rear axle comprising a twin axle formed from a driven, steered axle and a steered trailing or leading axle.

30. An omnibus as defined in claim 1, wherein the omnibus has a drop-frame construction.

31. An omnibus, comprising:

steered front wheels as well as steered and driven rear wheels, said rear wheels being arranged in a rear end region of the omnibus such that wheel housings associated with the rear wheels are arranged essentially outside a passenger compartment of the omnibus; and an electric drive comprising at least one electric wheel hub motor free of slip for driving the rear wheels;

wherein a steering movement of the rear wheels is coupled to a steering movement of the front wheels such that a predeterminable, virtual wheelbase $R_v$ is generated which is shorter than an actual wheelbase $R_t$.

32. An omnibus as defined in claim 31, wherein:

said wheel housings are arranged essentially at the rear end of the omnibus.

33. An omnibus, comprising:

steered front wheels as well as steered and driven rear wheels, said rear wheels being arranged in a rear end region of the omnibus; and an electric drive comprising at least one electric wheel hub motor free of slip for driving the rear wheels; wherein:

a steering movement of the rear wheels is coupled to a steering movement of the front wheels; and for maneuvering the omnibus below a certain traveling speed, the coupling of the steering movements of the front wheels and rear wheels is adapted to be overridden and the steering of the rear wheels is adapted to be freely controlled.

\* \* \* \* \*

UNITED STATES PATENT AND TRADEMARK OFFICE
CERTIFICATE OF CORRECTION

PATENT NO. : 5,813,487
DATED : September 29, 1998
INVENTOR(S) : Lee, et al.

It is certified that error appears in the above-identified patent and that said Letters Patent is hereby corrected as shown below:

On the title page, above item [51];
    Int. Cl.6 ............... B60K 1/00"  and col. 1, line, add:

--[63]    Related U.S. Application Data Continuation of PCT/EP95/03441 Sept. 1, 1995 -- .

Signed and Sealed this

Twentieth Day of April, 1999

Attest:

Q. TODD DICKINSON

*Attesting Officer*    *Acting Commissioner of Patents and Trademarks*